Inventors
Herbert Feger
Werner Hafen
by Ernest G Montague
Attorney

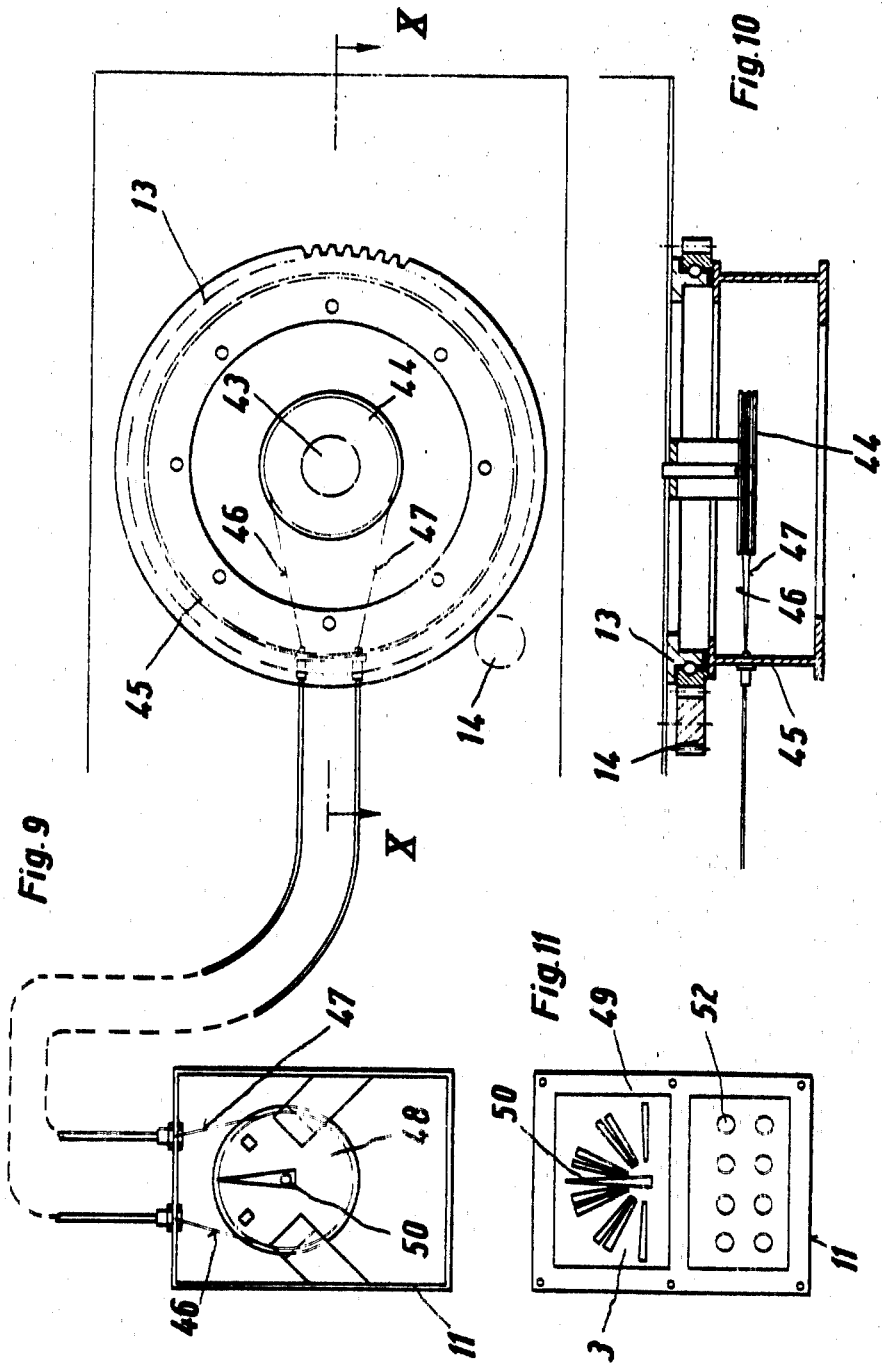

United States Patent Office 3,488,036
Patented Jan. 6, 1970

3,488,036
ROPE-DRAG LINE DEVICE FOR CONVEYING
OF BULK GOODS
Herbert Feger, Spessart, Baden, and Werner Hagen,
Ettlingen, Baden, Germany, assignors to Elba Werk
Ettlinger Baumaschinen- und Hebezeugfabrik G.m.b.H.,
Ettlingen, Germany, a corporation of Germany
Filed Aug. 21, 1967, Ser. No. 661,969
Claims priority, application Germany, Mar. 9, 1967,
E 33,556
Int. Cl. B66c 13/18
U.S. Cl. 254—147        12 Claims

ABSTRACT OF THE DISCLOSURE

A rope drag line device for conveying of bulk goods for feeding an allocator for concrete preparing apparatus, wherein aggregate materials are stored in sector-shaped storing places about the allocator and are piled up toward the latter, which comprises an allocator, and a chassis supported by the allocator. A beam is pivotally secured at one of its free ends to the chassis, a drag container, a pulling rope, and a return rope are arranged. The drag container is operatively connected with the pulling rope and the return rope. Two separate rope drums are disposed in the chassis, and the pulling rope and the return rope are guided by means of rope loops independently from each other over the respective drums. A shaft is mounted in the chassis, and a motor drives the shaft. The drums are mounted on the shaft and the rope drum receiving the pulling rope is secured to the shaft for joint rotation. The rope drum receiving the return rope is freely rotatable on the shaft. Clutch means are disposed between the shaft and the rope drum receiving the return rope for selective joint rotation of the last mentioned rope drum with the shaft, in order to retard the free movement of the return rope drum for maintaining the return rope in a taut state. Brake means are operatively connected with the return rope drum for retarding the rotation of the return rope drum operative during the lowering of the drag container. A spindle switch device is provided which includes a rotatable spindle and switches at opposite ends thereof and rendered operative at selected positions upon rotation of the spindle, and the switches are disposed in the circuit of the motor and reverse the direction of rotation of the motor upon closing the same.

The present invention relates to a rope drag line device for conveying of bulk goods in general, and for conveying of building materials and feeding to an allotter for concrete preparing devices in which the aggregate materials are stored in sector-shaped storage places disposed about the allotter and against which they are sloped up.

A rope drag line device is already known, which comprises an L-shaped bridge rotatably mounted on the allotter, which bridge supports itself, on the one hand, with its long arm spreading over the storage places, on the allotter and, on the other hand, with its short approximately vertical arm on the ground and a rope driven drag container is moved between the ends thereof. The bridge can be moved by means of a running gear disposed on the short supporting end and moving on the ground along the periphery of the sector-shaped storage places and disposed at the short supporting end, from one storage place to another and the different aggregates can be piled up towards the allotter. By the closure means of the latter, the aggregates then are brought by their own gravity into a dosing container, in which the proportions for a mixing good charge are set up. The ropes moving the drag container are pulled by means of a winch, which is operated by an operator, who does not enter anymore, contrary to the previous hand drag devices, the aggregate storage places, rather merely controls the movement of the rope winch and of the running gear.

It is furthermore known to mount, a beam drag device on an allotter, in which the drag rope is guided on a free beam. The beam is connected to a chassis and is adjustable as to its height, which chassis sits rotatably on the allotter and carries a cab in which the operator finds his place. From the operating place he moves the beam over the different aggregate storage places and controls the run of the drag container. In these known drag devices, in addition to the operator for the mixer guide, another operator is still required by all means for the guide of the drag.

It is one object of the present invention to provide a rope drag line device for conveying of bulk goods, in particular of building construction material for feeding an allotter for concrete preparing devices, which are fully automatically operated from a remote operating stand, as well as which can be controlled from the remote operating stand, so that a concrete preparing device can be maintained in operation and observed from its first working step, namely, that of the feeding of the aggregates, up to the last working step, namely, the release of the finished concrete by a single operator.

It is another object of the present invention to provide a rope drag line device for conveying of bulk goods, wherein a beam is pivotally secured to a rotatable chassis with a free end on one side and for the full automatic operation of the drag container a pulling rope as well as a return rope are guided by two separate rope drums in a rope loops independent from each other, which rope drums are disposed on a joint shaft mounted in the chassis and jointly driven by a motor, whereby the rope drum receiving the pulling rope is secured to the shaft for joint rotation therewith, and the rope drum receiving the return rope is freely rotatable on the shaft, however, connectable with the shaft for joint rotation by means of a coupling or clutch, the free movement of the return drum being retarded for keeping the rope taut and for lowering of the drag container by means of a brake and the working range of the drag container is selectively adjustable by means of a spindle switch.

For the safe guidance of the pulling rope on the pulling rope drum, two obliquely disposed keep-off rollers are provided at the rope inlet into the chassis, between which keep-off rollers the rope is guided over a following guiding roller to another return pulley, which is disposed at the rear of the chassis and from which the rope finally reaches the pulling rope drum. Between the rope inlet and the return pulley, as well as between the return pulley and the rope drum, there is provided a relatively long rope path, which permits a safe rope guide even with an inclined start of the filled drag container and thereby a safe drumming of the pulling rope even at high speed of the pulling rope drum. For further securing, a rope sweep is provided as a rope guard between the return pulley and the pulling rope drum in the freely movable sweep arm of which a roller is pushed on the rope. As soon as during the operation too much slack rope is formed, the sweep arm of the rope guard is lowered over a permissible degree and operates a switch which stops the drum drive.

The spindle switch, which serves the purpose of setting of the working range of the drag container, is driven by means of a chain over two wheels, one of which is disposed on the rope drum drive shaft and the other of which sits on the spindle of the switch with an overcharge safety device. On the spindle is disposed a switching cam, which is displaced by the spindle movement and operates in response to an end switch, which is arranged on both sides of the spindle. The end switches can be adjusted from the outside and by such arrangement the switching points of the rotation reversion of the drive motor, as well as of the coupling or clutch in the return rope drum, thus the entire working range of the drag container are adjustable.

The trailing brake and the lowering brake for the return rope drum are formed integrally as one unit and operate as normal spring-pressure multi-disc brakes over a chain drive on the return rope drum, for which purpose a first chain pulley and a second chain pulley are disposed on a common shaft of the two brakes. The connection of the trailing brake, in case the return rope drum is freely movable on the drive shaft to maintain taut the rope during the drag procedure and the connection of the lowering brake during lowering of the empty drag container from its upper return position to a bulk goods storage place, respectively, takes place likewise by means of the spindle switch in connection with time relays disposed in the control circuit.

Instead of spring pressure multi-disc brakes, also a liquid lowering brake and trailing brake, respectively, can be provided. Such liquid brake comprises an hydraulic pump and an hydraulic motor, respectively, adjustable throttles with return values and a control valve, which selectively switches the trailing throttle and the lowering throttle, respectively, into the liquid circuit or removes it from the circuit, and in this manner renders taut the return rope and a retardation of the lowering process of the empty drag container, respectively.

The hydraulic brake can be designed in a simplified embodiment also as a one-cycle brake. In a ring conduit there is disposed only one pressure regulating valve, which is designed simultaneously as one-way return valve. The oil, fed by means of a pump through the ring conduit corresponding with the prevailing direction of feeding, either builds up a brake pressure or it runs freely through the ring conduit upon reversal of the direction of rotation of the pump without pressure built-up. During the production of a brake pressure the movement of the drag container is retarded, and in the other case the movement of the drag container is not influenced.

For remote control of the prevailing stand of the beam and for remote control of the swinging process of the beam, a remote indicator is provided which creates by means of wire pulls a connection between the swinging axis of the drag chassis with the control device, from which the operator operates and controls the total working process of the concrete preparing device. Upon swinging of the chassis and, thereby, of the beam of the drag device over one of the plurality of sector-shape aggregate storing places, an indicator is operated by wire-pulls from the swinging axis of the chassis, which indicator reflects on an indicator table at the remotest operating stand the position of the beam.

The rope drag line device designed in accordance with the present invention, has the advantage that, while having a simple structure, a completely safe and automatic functioning of the operation of the drag container is assured. All the functions can thereby be operated and controlled from a remotely positioned operating stand. It is even no longer required, that the operator of the concrete manufacturing device, of which the drag apparatus is one portion, upon resetting of the beam from one aggregate bearing place to another, provides information at this place about the correct location of the beam. This information is transmitted directly from the chassis the rotary ring to the remotely positioned operating stand and can there be compared with an image about the position of the individual sector shape aggregate material storing places.

It is yet another object of the present invention to provide a rope drag line device for conveying of bulk goods, wherein two rope drums are driven by a single motor, so that at any time a resetting of the working range of the drag container is possible by means of a manual operation, that a slack rope formation is practically excluded during the operation, and also that without difficulty the high working outputs can be obtained without additional operator, for which until now a radial drag works, served by an operator was required.

With these and other objects in view, which will become apparent in the following detailed description, the present invention will be clearly understood in connection with the accompanying drawings, in which:

FIG. 4 is a fragmentary view indicating a liquid brake used in the device disclosed in FIG. 2;

FIG. 9 is a bottom plan view of the chassis disclosed in FIG. 2 with the indicator device for the beam position;

FIG. 10 is a section along the lines 10—10 of FIG. 9;

FIG. 11 is a front elevation of the front plate of the indicator device shown in FIG. 9.

Figure 1:
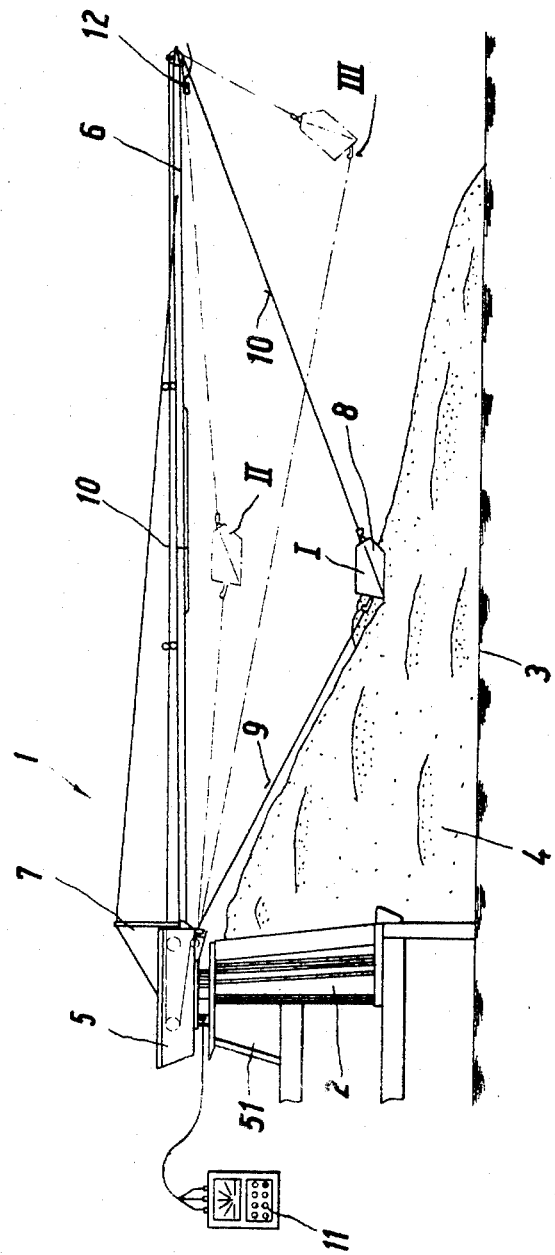
FIGURE 1 is a total side elevation of an automatic rope drag line device mounted on an allotter.
Figure 2:
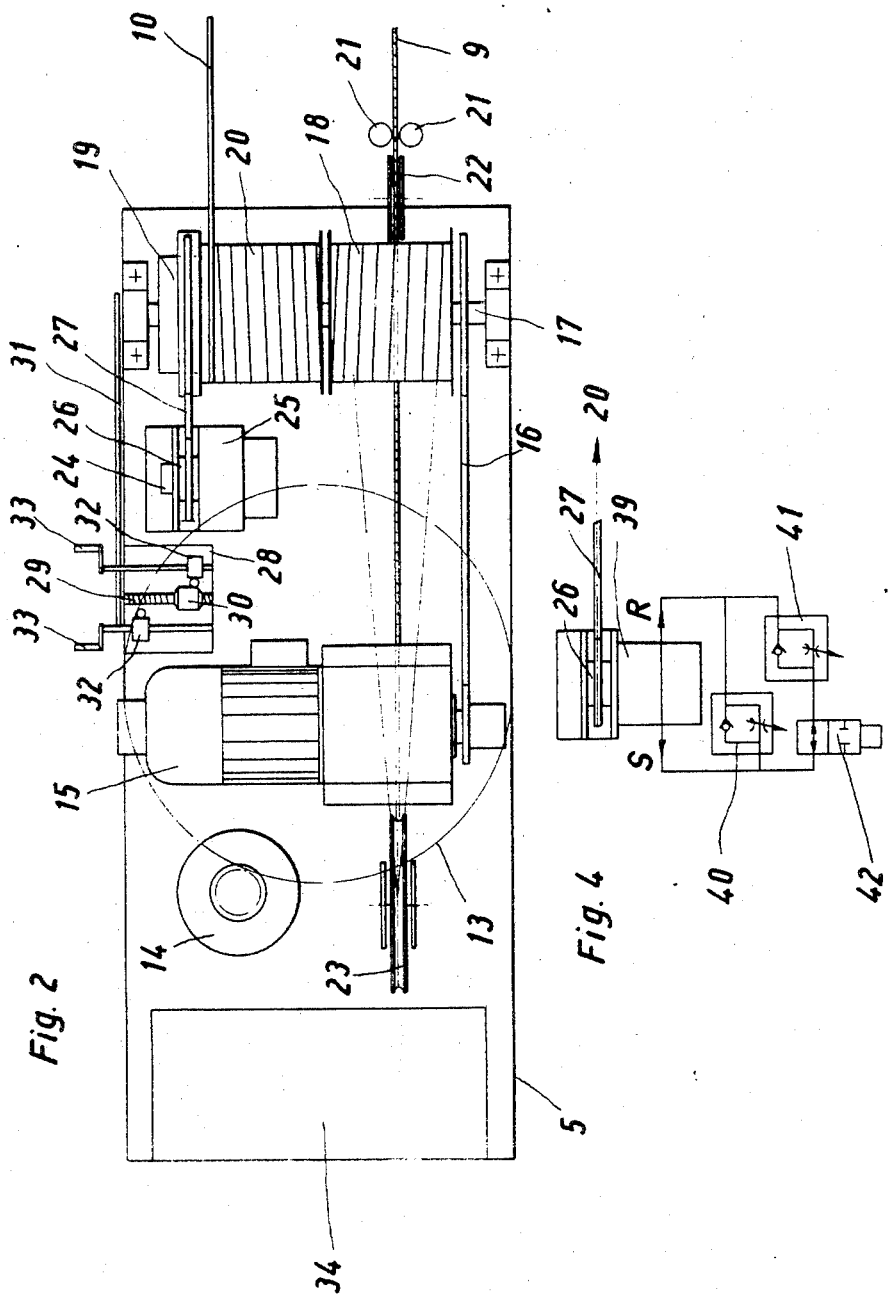
FIG. 2 is a top plan view of the chassis of the automatic rope drag line device, disclosed in FIG. 1.

Referring now to the drawings, and in particular to FIGS. 1–5, the automatic rope drag line device 1 designed in accordance with the present invention is mounted on an allotter 2, which serves as rear closure of sector-shaped aggregate storing places 3 and against which the aggregate material 4 is piled up. The rope drag line device 1 comprises substantially a rotatable chassis 5, a beam 6 pivotally connected to the chassis 5 and having a free end, a beam tensioning means 7, a drag container 8, a pulling rope 9, a return rope 10, and a remote control, as well as remote indication device 11. Three positions of the drag container 8 are indicated in FIG. 1 from its movement path, which movement path is performed fully automatically. In the position I, the drag container 8 feeds bulk goods from the storage to the allotter point. In position II, the empty drag container 8, floating over the bulk goods storage, is returned from the allotter to the beam point. In position III, the lowering of the drag container 8 takes place back from the beam point to the bulk goods storage. A safety switch 12 is arranged in case of disturbance in the movement performance of the drag container for the protection of the beam 6 at its end. The chassis 5 is secured rotatably on the allotter 2 above a rotary ring 13. The rotation of the chassis 5 and, thereby, the swinging of the beam 6 over the individual sector-shaped aggregate storing places 3 takes place by means of a swinging mechanism 14. The driving motor 15 is disposed approximately at the center of the chassis 5, which driving motor 15 drives a shaft 17 mounted in the front portion of the chassis 5 above the chain drive 16. On the shaft 17 is mounted for joint rotation therewith the rope drum 18 for receiving the pulling rope 9 and freely rotatable thereon, however, connectable for joint rotation by means of a clutch 19 with the shaft 17, the rope drum 20 for receiving of the return rope 10. The inlet for the pulling rope 9 into the chassis 5 comprises the substantially vertical keep-off rollers 21 and a guide roller 22 disposed therebehind. In the rear part of the chassis 5 is disposed a reversing roller 23 over which the pulling rope 9 is likewise guided. In order to maintain taut the return rope during the feeding process, during which the return rope drum 20 moves freely on the shaft 17, the trailing brake 24 and for braking the drag container 8 during the lowering procedure the lowering brake 25 are arranged. Both brakes are integrally formed on a joint shaft 26 and operate by means of the chain drive 27 the return rope drum 20. For setting the working range of the drag container 8, a spindle switch 28 is still arranged in the chassis 5. Its spindle 29 with the switch cam 30 disposed thereon is driven by the chain drive 31 from the drive shaft 17. On both sides of the spindle 29 are disposed end switches 32 which fix the switching points for the reversal of direction of rotation of the motor 15, as well as of the coupling or clutch 19. The end switches 32 are adjustable from the outside by means of cranks 33 and thereby the working range of the drag container 8 is variable. A switch box 34 is also provided in the chassis 5, which switch box 34 receives those parts required for the electric control, which parts are of conventional nature and do not form part of the present invention.

Figure 3:
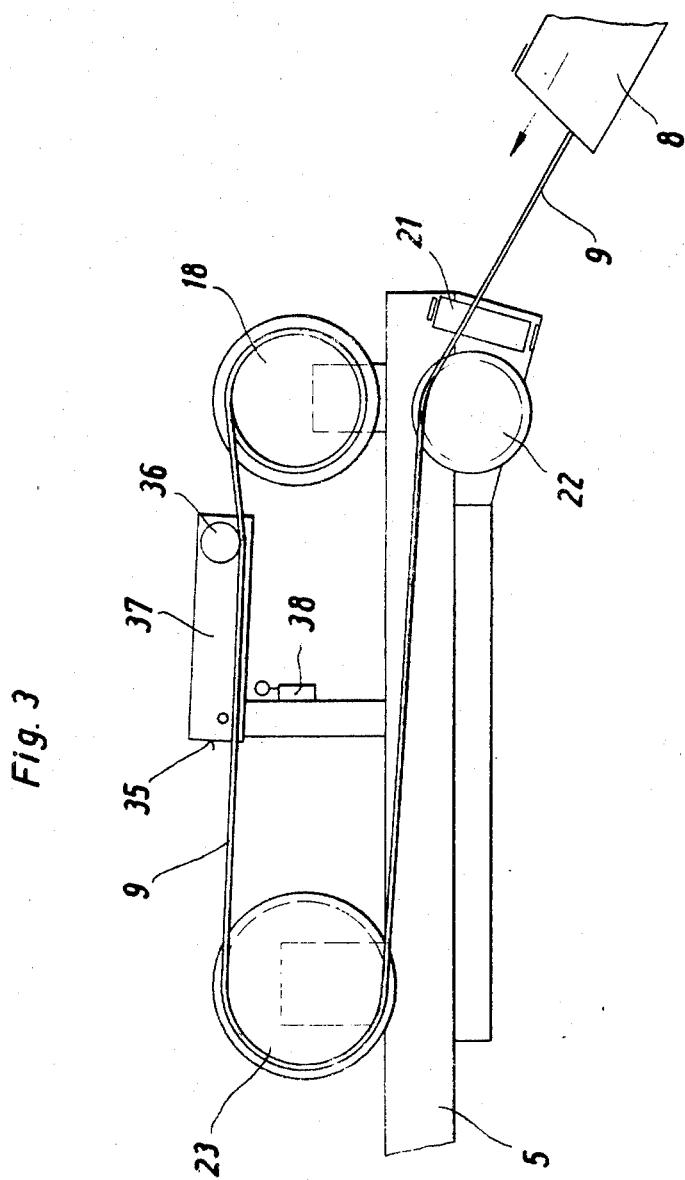
FIG. 3 is a fragmentary view indicating a guide for the pulling rope and the chassis as shown in FIG. 2.
Figure 5:
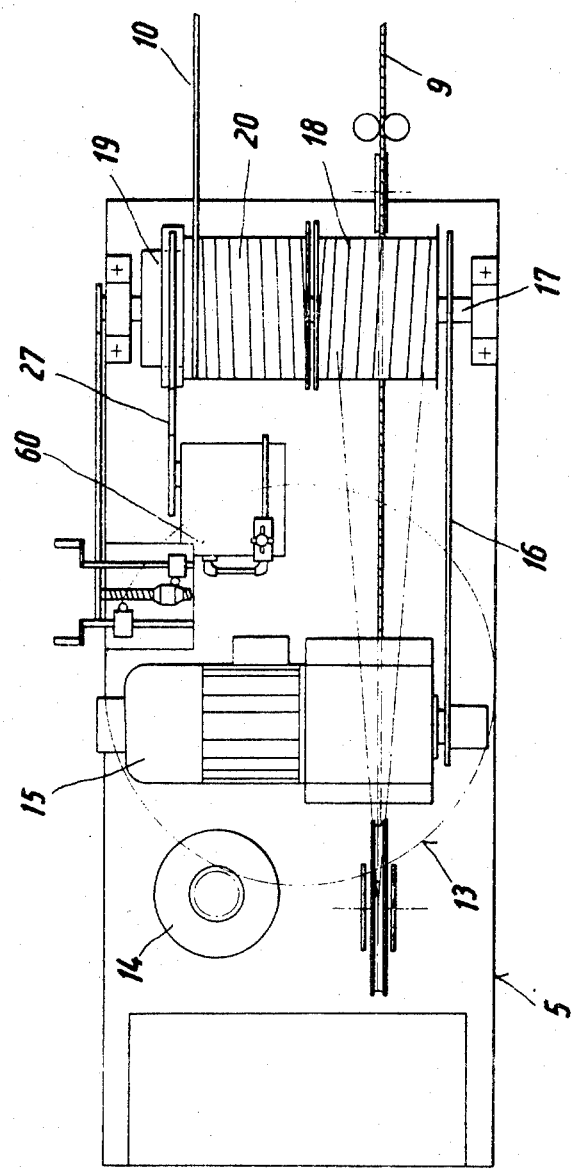
FIG. 5 is a top plan view indicating a hydraulic brake in the chassis disclosed in FIG. 2.

Referring now again to the drawings and in particular to FIG. 3, the guide of the pulling rope 9 within the chassis 5 is shown. Between the keep-off rollers 21 the pulling rope 9 leads to the guide roller 22 disposed directly behind the keep-off rollers 21 and from thereto the reversing roller 23 and finally onto the rope drum 18. In the rope path between the reversing roller 23 and the rope drum 18, a rope guard 35 is provided, the roller 36 of which presses with the weight of a freely movable sweep arm 37 onto the pulling rope 9. As soon as the sweep arm 37 is lowered beyond a permissible amount due too large slack rope formation or due to another error, as for instance rope brake, the switch 38 is operated, which stops then the driving motor 15. The keep-off rollers 21 assure also in case of an oblique inlet of the filled drag container 8 an exact entrance of the pulling rope 9 into the chassis 5.

Referring now again to the drawings, and in particular to FIG. 4, another embodiment of the lowering and trailing brake is disclosed in form of a liquid brake. The liquid brake comprises a hydraulic pump 39, a lowering throttle 40, a trailing throttle 41, a control valve 42, a joint shaft 26 and a chain drive 27 for the transmission of the brake force to the return rope drum 20. The two throttles 40 and 41 contain return valves for a build-up of a non-braked circle during the return movement of the drag container 8. During the lowering procedure of the drag container 8, the liquid column is fed from the hydraulic pump 39 in the direction S and through the lowering throttle 40 into the hydraulic circuit, whereby the control valve 42 is closed and the trailing throttle 41 is out of function. The lowering throttle 40 is adjusted such, that the moment derived from the liquid brake over the chain drive 27 corresponds with the desired lowered speed of the drag container 8 (FIG. 1, position III). Upon termination of the lowering procedure, thus at the start of the feeding process of the drag container 8 (FIG. 1, position I), the control valve 42 is switched to passage and the trailing throttle 41 is included into the liquid circuit. The trailing throttle 41 is set such, that it produces jointly with the lowering throttle 40 such braking moment on the pump shaft 26 and over the chain drive 27 on the return rope drum 20, that the return rope 10 loosely unwinding from the return rope drum 20, is maintained in a taut state. During the return guide of the drag container 8 (FIG. 1, position II) in its empty state above the bulk goods storage, the liquid column is fed from the pump 39 in the direction R and returns in its unbraked state into the circuit by the return valves which are now open and disposed in the throttle 40 and 41 with the control valve 42 opened.

Figure 6:
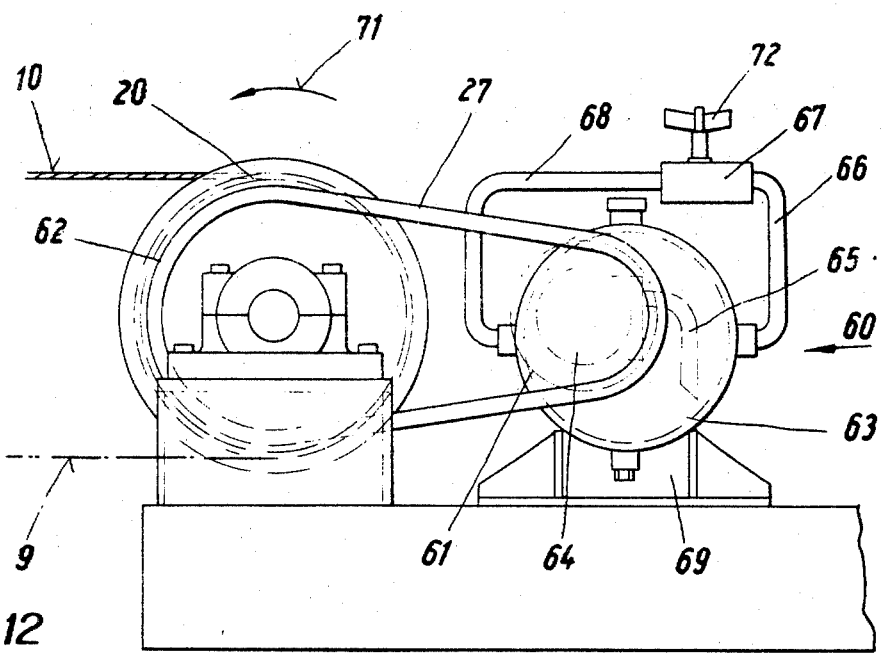
FIG. 6 is a side elevation of the hydraulic brake with return rope drum according to FIG. 5.
Figure 12:
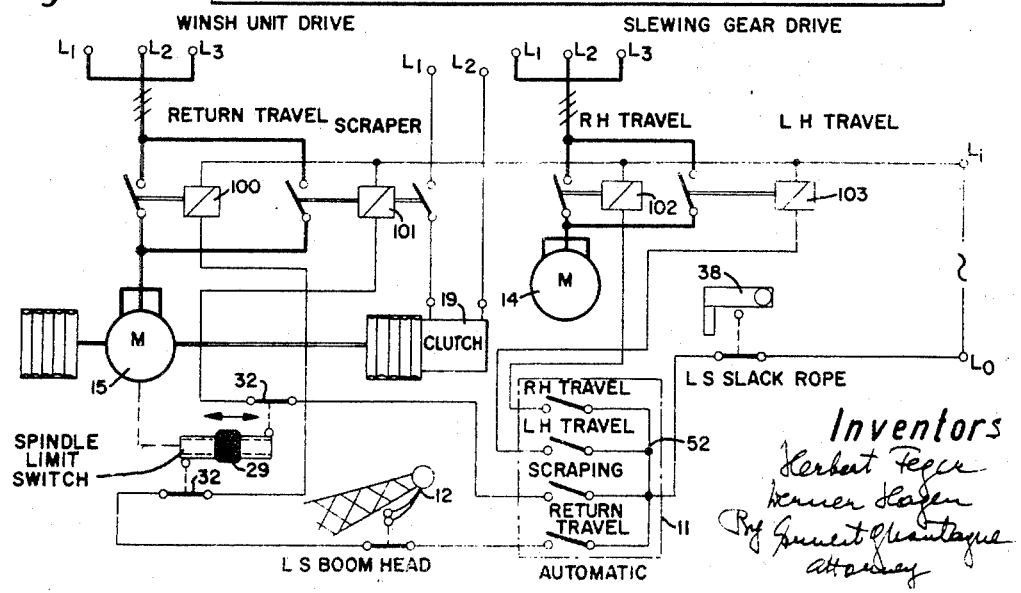
FIG. 12 is a schematic diagram of the motor circuit.
Figure 7:
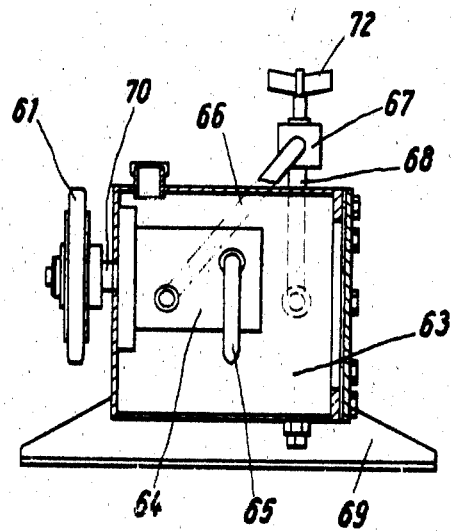
FIG. 7 is a side elevation of the hydraulic brake as disclosed in FIG. 6.
Figure 8:
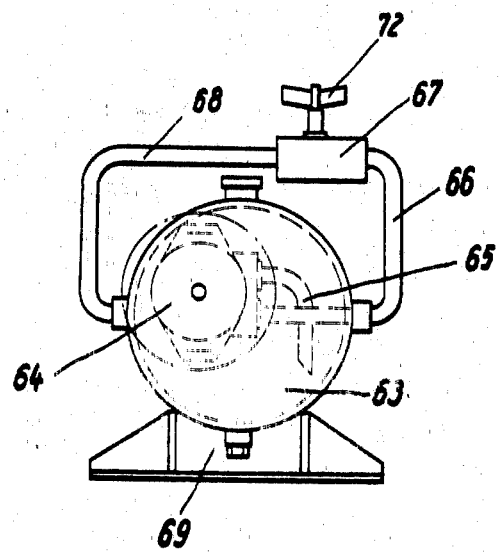
FIG. 8 is a rear elevation of the hydraulic brake as shown in FIG. 7.

Referring now again to the drawings, and in particular to FIGS. 5–8, in order to maintain the return rope 10 in its taut state during the conveying process I, during which the return rope drum 20 moves freely on the shaft 17 and for the braking of the drag container 8 during the lowering process III, the improved hydraulic brake 60 is provided. The braking force is transmitted with the opened clutch 19, thus with freely running return rope drum by means of the chain pulley 61, the chain 27 and the chain pulley 62 on the return rope drum 20 (FIG. 6). The hydraulic brake comprises an oil container 63, a pump 64 disposed therein, a suction branch 65 extending from the pump 64 into the oil container 63, a pressure conduit 66 emerging from the pump 64, a pressure control valve 67, a return conduit 68 leading back into the oil container 63 and a stand 69. The chain pulley 61 (FIG. 7) is secured to the shaft 70 of the pump 64, which chain pulley 61 is connected by means of the chain 27 with the chain pulley 62 on the return rope drum 20.

Referring now again to the drawings, and in particular to FIGS. 9–11, the remote operation and the remote control of the prevailing position of the beam 6 is shown above the respective sector-shaped aggregate-storing places 3. On the rotary axis 43 of the chassis 5 is disposed a rope pulley 44 from which a closed rope loops 46 and 47 leads to a remotely disposed control device 11 by means of a rigid setting ring 45. In the control device, the rope loops 46 and 47 run on a rotary disc 48. Each rotation of the chassis 5 performed by means of the swinging mechanism 14 and the rotary ring 13 and, thereby, of the beam 6 causes forcibly likewise a rotation of the rotary disc 48 in the remote control device 11. On the front disc 49 of the remote control device 11 are marked the sector-shaped storing places 3. In front of this marking runs a pointer 50 which is driven by the rotary disc 48, which pointer 50 reflects the actual position of the beam 6. The individual operator, who serves and observes a total concrete preparing arrangement, including the automatic rope drag-line device at any selected place, for instance, in a cabin 51, from which he has no clear view over the bulk goods storage places 3, is in the position to move the beam 6 into any desired position from the remote control device 11 by means of push buttons 52 and to control the beam position by observation of the pointer 50.

The automatic rope drag-line device designed in accordance with the present invention operates in the following manner.

Wtih the assumption that the drag container 8 is disposed in the conveying process I, the driving motor 15 drives the pulling rope drum 18 in corresponding direction of rotation by means of the chain drive 16 and the shaft 17, and, thereby, pulls the drag container 8 over the pulling rope 9 to the allotter 2. The coupling or clutch 19 is put thereby into inoperative position, the return rope drum 20 rotates freely on the shaft 17, is, however, braked by the trailing brake 24 over the chain drive 27 such, that the running-off return rope 10 remains taut. In the upper working position of the drag container 8, in front of the allotter 2, the switching cam 30 of the spindle switch 28, which is driven by the chain drive 31, operates the corresponding end switch 32, which stops the driving motor 15. Simultaneously, the coupling or clutch 19 is put into operative position and the driving motor 15 is switched over to opposite direction of rotation by a time relay disposed in the switch box 34. The return conveyance II of the drag container 8 starts thereby. The driving motor 15 drives now both rope drums 18 and 20 synchronously by means of the chain drive 16 and the shaft 17, whereby the pulling rope 9 runs off the pulling rope drum 18 and the drag container 8 is returned by means of the winding return rope 10 in the direction to the beam point. Shortly prior to the arrival of the drag container 8 at the point of the beam 6, the spindle cam 30 operates in the spindle switch 28, the other corresponding end switch 32, which stops the driving motor 15. A coordinated relay (not shown) in the control box 34 switches off simultaneously the coupling or clutch 19, as well as puts into operation the lowering brake 25 and the lowering conveyance or process III, which returns the drag container 8 from the beam point in a braking position to the bulk goods storage 4 runs off. Upon run-off of a time relay in the switch box 34, the lowering process is terminated, the driving motor 15 is switched to the previous direction of rotation, the lowering brake 25 is put into operative position and with the following conveyance process I of the drag container 8, a new working cycle starts.

Upon arrangement of the improved hydraulic brake in accordance with FIGS. 5–8, the function of the operation of the present device is changed in the following manner:

With the assumption that the drag container 8 is in the conveying process I, the driving motor 15 drives the pulling rope drum 18 in corresponding direction of rotation by means of the chain drive 16 and the shaft 17 and pulls the drag container 8 by means of the pulling rope 9 to the allotter 2. The coupling or clutch 19 is switched off, thereby, and the return rope drum 20 runs in the direction of the arrow 71 (FIG. 6) freely on the shaft 17, while the return rope 10 runs off. During the uniform, relatively slow rotary movement of the return rope drum 20, the pump 64 feeds a constant quantity of oil without building a high pressure in the pressure conduit 66. The braking force, which is transmitted, thereby, by means of the chain 27 to the return rope drum 20, is accordingly low and just suffices to maintain taut the running off return rope 10. In the upper conveyance position of the drag container 8, in front of the allotter 2, the driving motor 15 is switched over, the coupling or clutch 19 is put into operation, the drag container 8 is lifted from the aggregate material storage 4 and is returned with opposition direction of rotation of the return drum 20 below the beam 6 along up to its point. By this arrangement, also the pump 64 is driven in opposite direction and feeds by means of the return conduit 68 through the pressure control valve 67, which is now free, and the pressure conduit 66 into the oil container 63. A counter pressure cannot be built up thereby, and no braking force is effective upon the return rope drum 20. This state changes itself again, as soon as the drag container 8 reaches the point of the beam 6, the driving motor 15 is stopped and the coupling or clutch 19 is put out of operation. At this point practically the free fall of the drag container 8 starts under the influence of its gravity. The number of revolutions of the return rope drum 20 increases, which is now running again in the direction of the arrow 71, from zero very fast, likewise the number of revolutions of the pump 64 driven by means of the chain 27 and the chain pulley 61, which pump 64 builds up now likewise fast a high counter pressure in the pressure conduit 66 and retards strongly the acceleration of the return rope drum 20. The empty drag container 8 is thereby slowed up approximately in the position III, shown in FIG. 1 its falling movement is now lowered, always more slowing up until it returns to the aggregate material storage. It sets down there flat by means of the likewise lowering pulling cable 9, without the danger of the occurrence of tipping and with the starting of the driving motor 15 in the original direction of rotation, the conveying process I starts again and thereby a new working cycle.

By operation of a sew screw 72 on the pressure control valve 67 (FIG. 7), the passing cross-section and, thereby, the achievable brake counter pressure can be adjusted to the path which must be performed by the empty drag container 8 from the point of the beam 6 up to the ground 3. This is practically required once only, namely during the setting up of the apparatus.

The total run of the operation of the rope drag line device takes place with selectable speed and variable working range completely automatically without requiring a particular operator, as it was necessary with the old structures.

While we have disclosed several embodiments of the present invention, it is to be understood that these embodiments are given by example only and not in a limiting sense.

We claim:
1. A rope-drag line device for conveying of bulk goods for feeding an allotter for concrete preparing apparatus, wherein aggregate materials are stored in sector-shaped storing places about the allotter and are piled up towards the latter, comprising
   an allotter,
   a chassis supported by said allotter,
   a beam pivotally secured at one of its free ends to said chassis,
   a drag container,
   a pulling rope,
   a return rope,
   said drag container being operatively connected with said pulling rope and said return rope,
   a pulling rope drum and a return rope drum disposed in said chassis,
   said pulling rope and said return rope being guided by means of rope loops independently from each other over said respective drums,
   a single shaft mounted in said chassis,
   a motor having a motor shaft and driving said shaft,
   transmission means for a driving connection of said motor shaft with said single shaft,
   said drums being mounted on said single shaft,
   said pulling rope drum receiving said pulling rope and being secured to said single shaft for joint rotation,
   said return rope drum receiving said return rope and being freely rotatable on said single shaft,
   clutch means disposed between said shaft and said return rope drum receiving said return rope for selective joint rotation of said return rope drum with said single shaft,
   brake means operatively connected with said return rope drum for retarding the rotation of said return rope drum operative during the lowering of said drag container, and maintaining said return rope in a taut state,
   a spindle switch device including a rotatable spindle,
   transmission means for driving said spindle by said single shaft,
   switches disposed at opposite ends of said spindle and rendered operative at selected positions upon rotation of said spindle, and
   said switches being disposed in the circuit of said motor and reversing the direction of rotation of said motor upon closing the same.

2. The rope drag line device, as set forth in claim 1, which includes
   two keep-off rollers disposed substantially vertically at the rope entrance within said chassis for guiding said pulling rope between said two keep-off rollers,
   a guide roller disposed adjacent said two keep-off rollers, and
   a reversing roller disposed in the rear part of said chassis remote from said guide roller, and
   said pulling rope is guided by said guide roller and said reversing roller to said pulling rope drum disposed in the front portion of said chassis.

3. The rope drag line device, as set forth in claim 1, which includes
   a safety switch secured at the free end of said beam and disposed in the circuit of said motor, in order to protect said beam if said drag container arrives at the free end of said beam.

4. The rope drag line device, as set forth in claim 1, wherein
   said spindle switch device comprises a switch cam axially movable along said spindle during rotation of the latter,
   a chain drive operated by said shaft and driving said spindle and
   means for adjusting the position of said switches relative to said spindle, in order to vary the working range of said drag container.

5. The rope drag line device, as set forth in claim 1, wherein said brake means operatively connected with said return rope drum comprises a trailing brake and a lowering brake, said brakes being adapted to brake said return rope drum during its free rotation on said shaft, both said brakes are united to form a single block, a common shaft for mounting both said brakes, a chain drive operatively connecting said common shaft with said first mentioned shaft, so that upon rotation of said common shaft the free rotation of said return rope drum is braked.

6. The rope drag line device, as set forth in claim 5, wherein said brake means comprises a hydraulic brake including a hydraulic pump, and throttle means for controlling the brake energy applied to said return rope drum so that said hydraulic pump transmits said brake energy built up in the hydraulic circuit over said chain drive to said return rope drum.

7. The rope drag line device, as set forth in claim 5, which includes a first chain wheel operatively connected with said return rope drum, a second chain wheel mounted on and operatively connected with said hydraulic brake, a chain connecting said first chain wheel with said second chain wheel, in order to transmit the free movement from said return rope drum to said second chain wheel, said brake means includes a hydraulic pump driven by said second chain wheel, and an oil container, said hydraulic pump being disposed inside of said oil container, a pressure conduit emerging from said pump and disposed in a closed hydraulic circuit, and said hydraulic pump building up a counterpressure in said pressure conduit, which counterpressure brakes the free rotation of said return rope drum.

8. The rope drag line device, as set forth in claim 7, wherein said closed hydraulic circuit of said hydraulic brake comprises an oil container, a suction branch disposed in said oil container, said hydraulic pump, said pressure conduit, a pressure control valve disposed in the latter, and a return conduit returning oil into said oil container.

9. The rope drag line device, as set forth in claim 8, wherein said pressure control valve comprises a one-way return valve, thereby assuring the free oil passage upon reversal of the direction of rotation of said pump.

10. The rope drag line device, as set forth in claim 1, wherein said chassis has a rotary axis, a rope disc disposed on said rotary axis, a remote control device including a rotary disc, a closed rope loop leading from said rope disc to said rotary disc, and said rotary disc being movable by said rope loop.

11. The rope drag line device, as set forth in claim 10, which includes a pointer operatively connected with said rotary disc, and a front disc disposed in front of said rotary disc and carrying an image of the arrangement of the aggregate storing places.

12. The rope-drag line device, as set forth in claim 1, which includes a threaded spindle for carrying each of said switches for movement of said switches along the longitudinal axis of said threaded spindle, and a crank secured to one end of said threaded spindle for manual adjustment of said switches relative to said rotatable spindle.

References Cited

UNITED STATES PATENTS

| | | | |
|---|---|---|---|
| 878,797 | 2/1908 | Harding | 212—132 |
| 1,543,402 | 6/1925 | Stevens | 254—173 |
| 1,555,907 | 10/1925 | Burke | 37—116 |
| 1,569,925 | 1/1926 | Hale | 254—173 |
| 1,848,972 | 3/1932 | Peebles | 254—175 |
| 2,106,493 | 1/1938 | Byers | 188—92 |
| 2,336,684 | 12/1943 | Hendrickson | 254—166 |
| 2,343,894 | 3/1944 | Fisher | 254—166 |
| 2,512,770 | 6/1950 | Fisher | 116—124 |
| 2,570,350 | 10/1951 | Kern | 254—185 |
| 2,893,809 | 7/1959 | Rahmel | 116—124 |
| 3,053,344 | 11/1962 | Buck | 254—173 |

FOREIGN PATENTS 1,351,784  3/1963  France.

HARVEY C. HORNSBY, Primary Examiner

U.S. Cl. X.R.

37—116; 116—124; 188—92; 214—93; 254—173, 185, 190